United States Patent
Hong et al.

(10) Patent No.: US 10,099,172 B2
(45) Date of Patent: Oct. 16, 2018

(54) CARBON DIOXIDE ABSORBENT COMPRISING TRIAMINE

(71) Applicant: UNIVERSITY-INDUSTRY COOPERATION GROUP OF KYUNG HEE UNIVERSITY, Yongin-si, Gyeonggi-do (KR)

(72) Inventors: Sung Yun Hong, Goyong-si (KR); Hoon Sik Kim, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 15/519,234

(22) PCT Filed: Oct. 16, 2015

(86) PCT No.: PCT/KR2015/010937
§ 371 (c)(1),
(2) Date: Apr. 14, 2017

(87) PCT Pub. No.: WO2016/060508
PCT Pub. Date: Apr. 21, 2016

(65) Prior Publication Data
US 2017/0246587 A1    Aug. 31, 2017

(30) Foreign Application Priority Data
Oct. 16, 2014    (KR) .................. 10-2014-0139979

(51) Int. Cl.
*B01D 53/62* (2006.01)
*B01D 53/14* (2006.01)
(Continued)

(52) U.S. Cl.
CPC ..... *B01D 53/1493* (2013.01); *B01D 53/1475* (2013.01); *B01D 2252/2025* (2013.01);
(Continued)

(58) Field of Classification Search
None
See application file for complete search history.

(56) References Cited

U.S. PATENT DOCUMENTS 6,623,659 B2    9/2003    Munson et al.
6,849,774 B2    2/2005    Boudreau et al.
(Continued)

FOREIGN PATENT DOCUMENTS

JP    3197173 B2    8/2001
JP    6098262 B2    3/2017
(Continued)

OTHER PUBLICATIONS

International Search Report for application No. PCT/KR2015/010937 dated Jan. 26, 2016.
(Continued)

*Primary Examiner* — Daniel Berns
(74) *Attorney, Agent, or Firm* — Sughrue Mion, PLLC

(57) ABSTRACT

The present invention relates to a carbon dioxide absorbent comprising a triamine, a diamine and a dialkylene glycol dialkyl ether or trialkylene glycol dialkyl ether. The carbon dioxide absorbent according to the present invention can improve the carbon dioxide absorption capacity, absorption rate, and regeneration performance thereof simultaneously by using the triamine as a main absorbent, the diamine as a rate enhancer, the dialkylene glycol dialkyl ether or trialkylene glycol dialkyl ether as a fine disproportionation agent and a regeneration promoter.

16 Claims, 1 Drawing Sheet

(51) Int. Cl.
  *B01D 53/78* (2006.01)
  *B01D 53/96* (2006.01)
(52) U.S. Cl.
  CPC .............. *B01D 2252/2041* (2013.01); *B01D 2252/20415* (2013.01); *B01D 2252/20436* (2013.01); *B01D 2252/504* (2013.01)

(56) References Cited

U.S. PATENT DOCUMENTS 7,880,036 B2 * 2/2011 Dahmen .............. C07C 209/48
544/358
2008/0146849 A1   6/2008 Dai et al.

FOREIGN PATENT DOCUMENTS

| KR | 10-2011-0099466 A | 9/2011 |
| KR | 10-2013-0000375 A | 1/2013 |
| KR | 10-2013-0050433 A | 5/2013 |
| WO | 2004/089512 A1 | 10/2004 |

OTHER PUBLICATIONS

Written Opinion for application No. PCT/KR2015/010937 dated Jan. 26, 2016.

* cited by examiner

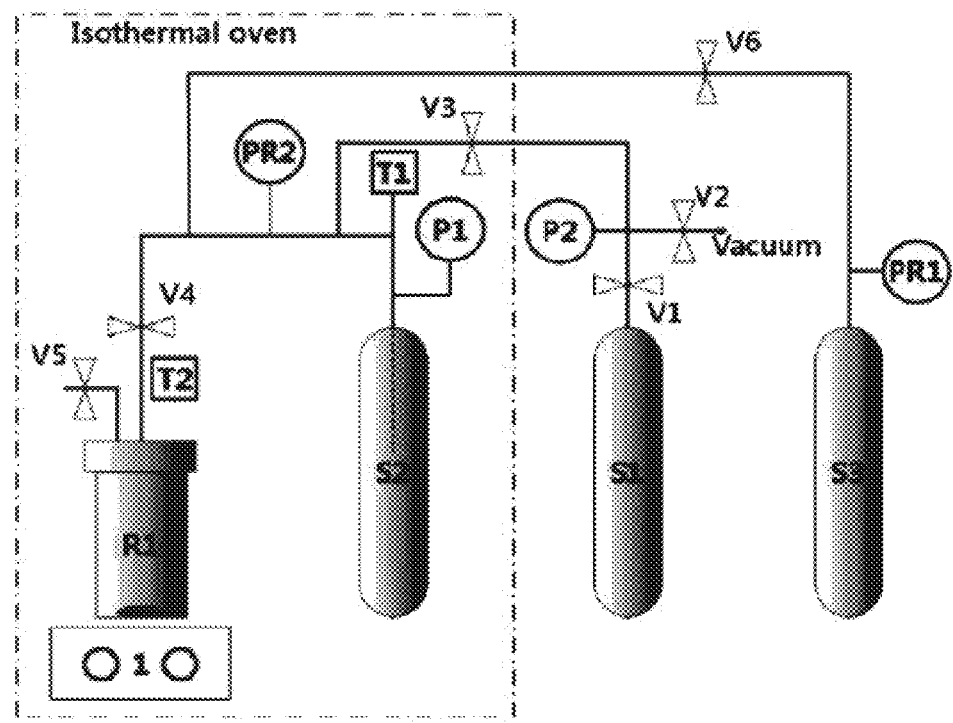

CARBON DIOXIDE ABSORBENT COMPRISING TRIAMINE

CROSS REFERENCE TO RELATED APPLICATIONS

This application is a National Stage of International Application No. PCT/KR2015/010937, filed on Oct. 16, 2015, which claims priority from Korean Patent Application No. 10-2014-0139979, filed on Oct. 16, 2014, the contents of all of which are incorporated herein by reference in their entirety.

TECHNICAL FIELD

The present invention relates to a carbon dioxide absorbent comprising a triamine, a diamine and a dialkylene glycol dialkyl ether or trialkylene glycol dialkyl ether. More specifically, the present invention relates to an amine-based carbon dioxide absorbent which is excellent in carbon dioxide absorption capacity, absorption rate and regeneration performance.

BACKGROUND OF ART

In general, an absorption method, an adsorption method, a membrane separation method, a cryogenic cooling method and the like are used to separate carbon dioxide ($CO_2$) from the exhaust gas of chemical plants, power plants or large-sized boilers and from natural gas. In particular, an absorption or adsorption method is widely used when the concentration of exhausted carbon dioxide is low.

The absorption or adsorption method is widely used since it can selectively separate only some gases that are well absorbed or adsorbed by an absorbent or adsorbent; however, there is a disadvantage that, since the absorbent or adsorbent is chemically altered during the separation process, it is necessary to periodically replace the absorbent or adsorbent. Therefore, in the case of using a solid adsorbent, the chemical alteration of the adsorbent is reduced, and thus it is advantageous for the adsorbent to be applied only when the adsorbent replacement cycle is long. On the other hand, since the absorption method uses a liquid absorbent and thus the absorbent is easy to replace and has a greater absorption capacity than that of the adsorbent, it is widely used in purification of a large amount of exhaust gas or used in gas separation; however, there is still a disadvantage that the liquid absorbent is chemically or thermally altered.

As carbon dioxide absorbents, aqueous solutions containing amines such as monoethanolamine (MEA), diethanolamine (DEA), piperazine or the like are widely used in industry. This is because these amine-based absorbents react with carbon dioxide to easily form stable carbamate compounds, and the carbamate compounds can be decomposed again into carbon dioxide and amine when heat is applied. However, the process for capturing carbon dioxide using these amine-based absorbents has several serious problems. In particular, due to high thermal and chemical stability of carbamate formed by reaction with carbon dioxide, the decomposition temperature is as high as 120° C. or more, thereby causing excessive regeneration energy consumption (MEA requires 4.0 to 4.2 GJ per ton of carbon dioxide), excessive volatile loss of amine due to the high regeneration temperature (4 kg per ton in the case of using MEA), and replenishment of an absorbent.

In order to resolve the drawbacks of the amine-based aqueous solution absorbents, there have been reported various methods of physically absorbing carbon dioxide using organic solvents such as Selexol, IFPexol, NFM, etc. One important advantage of the organic solvent absorbent is that much lower energy is required to recover carbon dioxide and recycle solvents since the absorption of carbon dioxide is achieved only by a physical interaction between the absorption solvent and carbon dioxide, not by the chemical bond as in the case of the aqueous amine absorbents. Actually, in the case of using the amine absorbent, the recovery of carbon dioxide and the recycling of the absorbent require an energy-intensive, high-temperature separating process; however, in the case of the physical absorption, it is possible to recover carbon dioxide dissolved in the solvent by simply changing the pressure, without increasing the temperature. However, the physical absorption process has the following drawbacks.

First, low carbon dioxide absorption capacity: Organic solvents generally exhibit a carbon dioxide absorption capacity at normal pressure that is significantly lower than that of an aqueous amine solution, such that the circulation rate of the absorbent is high, thus requiring relatively large equipment. Therefore, the organic solvent absorbent is more suitable for natural gas purification in which the pressure of carbon dioxide is high.

Second, high circulation rate: Physical absorption process by organic solvents typically requires twice higher absorbent circulation rate compared to amine solutions, thereby requiring more capital and equipment costs.

Therefore, there is a need for the development of a novel absorbent that has high thermal and chemical stability, and has low vapor pressure, so as to overcome the drawbacks of the amine absorbent and the organic solvent absorbent.

Recently, as a method for overcoming the drawbacks of conventional absorbents, attempts have been made to utilize, as an absorbent, an ionic liquid that is non-volatile, has high thermal stability and maintains a liquid phase at a low temperature of 100° C. or less, as disclosed in U.S. Pat. No. 6,849,774, U.S. Pat. No. 6,623,659 and US Patent Application Publication No. 2008/0146849. However, in order to synthesize these ionic liquids, not only complicated manufacturing steps of two or more steps are required but also the manufacturing cost is too high, so that there are many problems in industrial application. In addition, the physical absorbents such as organic solvents and ionic liquids are not suitable for capturing carbon dioxide from the exhaust gas discharged at atmospheric pressure after combustion because of their low ability to absorb carbon dioxide at low pressure.

Therefore, in order to capture carbon dioxide from the exhaust gas after combustion, a chemical absorbent must be always used. However, as mentioned above, the alkanolamine-based chemical absorbent such as MEA has several drawbacks; in particular, there is a problem that excessive regeneration energy is consumed. Recently, attempts have been made to reduce regeneration energy of chemical absorbents, including a method of using, as an absorbent, alkanolamine sterically hindered around amine groups, and a typical example thereof is 2-amino-2-methyl-1-propanol (AMP) which is a primary amine. When reacting with carbon dioxide, AMP forms bicarbonate compounds ([AMPH][$HCO_3$]) that may be regenerated more readily than carbamates, thereby requiring 30% less regeneration energy compared to MEA; however, its $CO_2$ absorption rate is less than 50% of the absorption rate of MEA.

As a method of increasing the absorption rate of AMP, Mitsubishi Heavy Industries, Ltd. and Kansai Electric Power Co., Inc. made a joint effort to develop a novel absorbent prepared by adding piperazine, which is a secondary cycloamine, to AMP (Japanese Patent No. 3197173). However, the absorbent disclosed in this patent has a problem in that precipitation occurs in the process of absorption of carbon dioxide, and when piperazine is reacted with carbon dioxide, thermally stable carbamate compounds are formed in addition to bicarbonates, such that a regeneration process is difficult to perform.

Further, there is also known a method of using, as a carbon dioxide absorbent, alkali carbonate, such as sodium carbonate or potassium carbonate, instead of using a primary alkanolamine absorbent; however, the method has a problem of low carbon dioxide absorption rate. As a method of increasing a carbon dioxide absorption rate, WO 2004/089512 A1 discloses that when piperazine or its derivative is added to potassium carbonate, a carbon dioxide absorption rate is significantly increased; however, this method has a problem such as the formation of precipitate in the process of using potassium carbonate.

DETAILED DESCRIPTION OF THE INVENTION

Technical Problem

Based on the fact that triamine and diamine-based compounds having primary and secondary amine groups react with carbon dioxide to mainly form ionic carbamate compounds, and these carbamate compounds are further stabilized in solvents with high polarity such as water and thus are not easily decomposed even at a temperature of 100° C. or higher, the present inventors have conducted tests to reduce the polarity of the solution by adding various organic solvents to the amine aqueous solution, so as to lower the stability of the carbamate. As a result, the inventors have found that, when dialkylene glycol dialkyl ether or trialkylene glycol dialkyl ether capable of being disproportionated finely in the aqueous solution is applied, the stability of the carbamate is remarkably lowered, thereby facilitating the regeneration of the amine. The present invention has been completed on the basis of such finding.

Therefore, an object of the present invention is to provide a carbon dioxide absorbent which is excellent in carbon dioxide absorption capacity, absorption rate and regeneration performance.

Another object of the present invention is to provide a method for separating carbon dioxide from a gas mixture using the carbon dioxide absorbent.

Technical Solution

In order to achieve the objects, the present invention provides a carbon dioxide absorbent comprising: a triamine represented by the following chemical formula 1, a linear diamine represented by the following chemical formula 2 or a cyclodiamine represented by the following chemical formula 3 and a dialkylene glycol dialkyl ether or trialkylene glycol dialkyl ether represented by the following chemical formula 4:

[Chemical Formula 1]

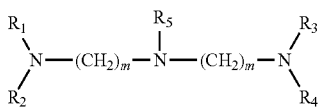

[Chemical Formula 2]

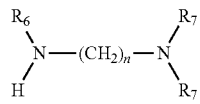

[Chemical Formula 3]

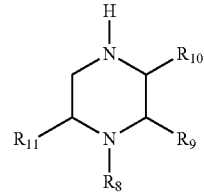

[Chemical Formula 4]

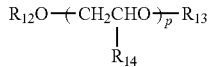

wherein, $R_1$, $R_2$, $R_3$ and $R_4$ are each independently hydrogen or a $C_1$-$C_4$ alkyl group, preferably hydrogen, methyl or ethyl, $R_5$ is hydrogen or a $C_1$-$C_4$ alkyl group, preferably hydrogen or methyl, $R_6$ and $R_7$ are each independently hydrogen or a $C_1$-$C_4$ alkyl group, preferably hydrogen, methyl or ethyl, $R_8$ is hydrogen, a $C_1$-$C_4$ alkyl group or a $C_1$-$C_4$ aminoalkyl group, preferably hydrogen, methyl, ethyl, propyl, butyl or aminoethyl, $R_9$, $R_{10}$ and $R_{11}$ are each independently hydrogen or a $C_1$-$C_4$ alkyl group, preferably hydrogen or methyl, $R_{12}$ and $R_{13}$ are each independently a $C_1$-$C_4$ alkyl group, preferably methyl, ethyl, propyl or butyl, $R_{14}$ is hydrogen or methyl, m is an integer of 2 or 3, n is an integer of 4 to 8, and p is an integer of 2 or 3.

As used herein, the $C_1$-$C_4$ alkyl group refers to a linear or branched hydrocarbon group having 1 to 4 carbon atoms, and includes, for example, methyl, ethyl, n-propyl, i-propyl, n-butyl, i-butyl, t-butyl or the like, but is not limited thereto.

As used herein, the $C_1$-$C_4$ aminoalkyl group refers to a linear or branched hydrocarbon group having 1 to 4 carbon atoms substituted with an amino group, and includes, for example, aminomethyl, aminoethyl, aminopropyl or the like, but is not limited thereto.

The triamine represented by the chemical formula 1 includes, for example, 2,2'-iminobis(N,N-dimethylethylamine), 2,2'-iminobis(N,N-diethylethylamine), 3,3'-iminobis(N,N-dimethylpropylamine), 3,3'-iminobis(N,N-diethylpropylamine), 2,2'-iminobis(N,N'-dimethylethylamine), N,N-bis[2-(methylamino)ethyl]methylamine, N,N-bis[3-(methylamino)propyl]methylamine, N,N'-(iminobisethylene)bismethaneamine, N,N'-(iminobispropylene)bismethaneamine and the like, but is not limited thereto.

The linear diamine represented by the chemical formula 2 includes, for example, 1,4-diaminobutane, 1,5-diaminopentane, 1,6-diaminohexane, 1,7-diaminoheptane, 1,8-diaminooctane, N,N-dimethyl-1,4-diaminobutane, N,N-diethyl-1,4-diaminobutane, N,N-dimethyl-1,5-diaminopentane, N,N-diethyl-1,5-diaminopentane, N,N-dimethyl-1,6-diaminohexane, N,N-diethyl-1,6-diaminohexane, N,N-dimethyl-1,7-diaminoheptane, N,N-diethyl-1,7-diaminoheptane, N,N-dimethyl-1,8-diaminooctane, N,N-diethyl-1,8-diaminooctane and the like, but is not limited thereto.

The cyclodiamine represented by the chemical formula 3 includes, for example, piperazine, 1-methylpiperazine, 1-ethylpiperazine, 1-propylpiperazine, 1-isopropylpiperazine, 1-butylpiperazine, 2-methylpiperazine, 1,2-dimethylpiperazine, 1,5-dimethylpiperazine, 1,6-dimethylpiperazine, N-(2-aminoethyl)piperazine and the like, but is not limited thereto.

The dialkylene glycol dialkyl ether or trialkylene glycol dialkyl ether represented by the chemical formula 4 includes, for example, diethylene glycol dimethyl ether, diethylene glycol diethyl ether, diethylene glycol ethyl methyl ether, diethylene glycol dipropyl ether, diethylene glycol dibutyl ether, dipropylene glycol dimethyl ether, dipropylene glycol diethyl ether, dipropylene glycol ethyl methyl ether, dipropylene glycol dipropyl ether, dipropylene glycol dibutyl ether, triethylene glycol dimethyl ether, triethylene glycol diethyl ether, triethylene glycol dipropyl ether, triethylene glycol dibutyl ether, tripropylene glycol dimethyl ether, tripropylene glycol diethyl ether, tripropylene glycol dipropyl ether, tripropylene glycol dibutyl ether and the like, but is not limited thereto.

The amount of the triamine may be 10 to 70% by weight, preferably 20 to 50% by weight, based on the total amount of the absorbent, considering the absorption capacity and absorption rate of carbon dioxide, and the viscosity of the absorbent. If the amount of the triamine is less than 10% by weight, the absorption rate and absorption capacity of carbon dioxide are lowered, and if it exceeds 70% by weight, the viscosity of the absorber solution increases, which causes a problem that the $CO_2$ absorption rate decreases and the absorbent transport becomes difficult.

The amount of the linear diamine or cyclodiamine may be 1 to 30% by weight, preferably 5 to 20% by weight, based on the total amount of the absorbent. If the amount of the linear diamine or cyclodiamine is less than 1% by weight, the effect of increasing the $CO_2$ absorption rate is insignificant. If the amount of the linear diamine or cyclodiamine is more than 30% by weight, there is a problem that energy consumption increases during the regeneration, while an increase in the $CO_2$ absorption rate is insignificant.

The amount of dialkylene glycol dialkyl ether or trialkylene glycol dialkyl ether is 5 to 40% by weight, preferably 10 to 30% by weight, based on the total amount of the absorbent. The amount of the dialkylene glycol dialkyl ether or trialkylene glycol dialkyl ether to be used varies slightly depending on the solubility in water, but in general, if the amount is less than 5% by weight of the total amount of the absorbent, the disproportionation phenomenon is weak and thus the regeneration effect of the absorbent decreases. If the amount exceeds 40% by weight, the regenerating effect of the $CO_2$ absorbent increases, but the viscosity of the absorbent becomes high and the concentration of amine becomes low. Thus, there is a problem that $CO_2$ absorption amount and absorption rate are lowered.

The carbon dioxide absorbent of the present invention comprising triamine, diamine and dialkylene glycol dialkyl ether or trialkylene glycol dialkyl ether can absorb carbon dioxide even in the absence of a solvent, but in consideration of the viscosity of the absorbent, it is desirable to use it in the state of an aqueous solution, that is, by dissolving the carbon dioxide absorbent in water.

The amount of water in the absorbent is 10 to 70% by weight, preferably 20 to 50% by weight, based on the total amount of the absorbent. If the amount of water is less than 10% by weight, the viscosity of the absorbent solution becomes high, so that the absorption rate of $CO_2$ and the regeneration capacity of the absorbent are significantly lowered, whereas when it exceeds 70% by weight, the viscosity of the absorbent is lowered, but there is a problem that the carbon dioxide absorption capacity is lowered.

The carbon dioxide absorbent according to the present invention can improve the carbon dioxide absorption capacity, absorption rate, and regeneration performance thereof simultaneously by using a triamine as a main absorbent, a linear diamine or cyclodiamine as a rate enhancer, and a dialkylene glycol dialkyl ether or trialkylene glycol dialkyl ether as a fine disproportionation agent and a regeneration promoter.

Among the constituents of the carbon dioxide absorbent according to the present invention, triamine, which is the main absorbent, and diamine, which is a rate enhancer, have high absorption rates, but they mainly generate an ionic carbamate compound having high thermal stability when reacted with carbon dioxide, which makes it difficult to regenerate. However, in the case where a dialkylene glycol dialkyl ether or a trialkylene glycol dialkyl ether is present in the carbon dioxide absorbent component, the fine disproportionation occurs in the absorbent solution, and therefore strong hydrogen bonding between the carbamate and water is weakened. As a result, the stability of the carbamate is lowered and the regeneration of the absorbent is facilitated.

Therefore, when the absorbent according to the present invention is used, not only the absorbent can be regenerated even at a low temperature compared with a conventional absorbent, but also the absorption capacity of carbon dioxide per unit volume of the absorbent can be maintained at a remarkably high level, and thus the energy of the overall absorption process can be drastically reduced and the problem of corrosion and absorbent loss derived from the high regeneration temperature can also be greatly reduced.

On the other hand, the present invention relates to a method for separating carbon dioxide from a gas mixture using the carbon dioxide absorbent according to the present invention. The separation method of the present invention comprises the steps of:

(i) absorbing carbon dioxide by using a carbon dioxide absorbent including a triamine represented by the chemical formula 1, a linear diamine represented by the chemical formula 2 or a cyclodiamine represented by the chemical formula 3, and a dialkylene glycol dialkyl ether or trialkylene glycol dialkyl ether represented by the chemical formula 4; and (ii) separating the absorbed carbon dioxide from the carbon dioxide absorbent.

Examples of the gas mixture may include exhaust gases that are discharged from chemical plants, power plants, ironworks, cement plants and large boilers, natural gases and the like.

When carbon dioxide is absorbed in step (i), the absorption temperature may be preferably in the range of 10° C. to 60° C., and more preferably in the range of 30° C. to 50° C.; and the absorption pressure may be preferably in the range of normal pressure to 30 atm, and more preferably in the range of normal pressure to 10 atm. In the case where the absorption temperature is above 60° C., separation of carbon dioxide is performed at the same time as the absorption such that the absorbed amount of carbon dioxide is reduced, whereas in the case where the absorption temperature is below 10° C., additional refrigeration equipment is required to lower the temperature, thereby causing economic inefficiency. Further, an exhaust gas has normal pressure, such that it is most economical to perform absorption at normal pressure. In the case where an absorption pressure is above 30 atm, although an absorption amount is greatly increased, additional equipment, i.e., a compressor, is needed to increase the pressure, thereby resulting in economic inefficiency.

When the absorbed carbon dioxide is separated in step (ii), the temperature may be preferably in the range of 70° C. to 140° C., and more preferably in the range of 80° C. to 120° C., and the separation pressure may be preferably in the range of normal pressure to 2 atm. In the case where the separation temperature is less than 70° C., the separation amount of carbon dioxide is greatly reduced, whereas in the case where the separation temperature is more than 140° C., not only the amount that the absorbent is evaporated and lost is increased but also the condition is the same as in the case of using monoethanolamine (MEA) as an absorbent, such that the advantages of the fine disproportionation absorber according to the present invention disappear. Further, it is difficult to perform separation at a high pressure of 2 atm or more, since a vapor pressure of water is required to be significantly increased to maintain such high pressure, thereby requiring high temperature and resulting in economic inefficiency.

Among the terms used throughout the present invention, the term "normal pressure" refers to atmospheric pressure, i.e., 1 atm.

Advantageous Effects

The carbon dioxide absorbent according to the present invention has high carbon dioxide absorption capacity and a high absorption rate, and has a high absorbent regeneration performance even at a low temperature as compared to prior absorbents, thereby significantly reducing the entire energy consumption, and it is possible to prevent the recovered carbon dioxide from being contaminated with the moisture and the absorbent vapor due to the low regeneration temperature. Moreover, even when absorption and separation of carbon dioxide are repeated, almost all of the initial absorption capacity can be maintained and thus it can be used as an excellent carbon dioxide separation medium.

BRIEF DESCRIPTION OF DRAWING

FIG. 1 is a schematic view illustrating an example of a device for carbon dioxide absorption and separation tests.

DETAILED DESCRIPTION OF THE EMBODIMENTS

Hereinafter, the invention is described more fully with reference to illustrative embodiments and the accompanying drawings. However, it would be obvious to those skilled in the art that the embodiments are merely illustrative for explanation of the present invention, and the scope of the present invention is not limited thereto.

Device and Process for Carbon Dioxide Absorption Tests

Tests on the carbon dioxide absorption capacity were conducted by using the device illustrated in FIG. 1. The device illustrated in FIG. 1 includes a 60 ml stainless steel absorption reactor R1 equipped with a thermometer T2, a pressure transducer for high pressure (0 to 70 atm) P1, a 75 ml carbon dioxide storage cylinder S2 equipped with a thermometer T1, and a stirrer 1, and is installed in an isothermal oven to measure the carbon dioxide absorption capacity at a constant temperature. Further, a carbon dioxide supply cylinder S1 and a manometer P2 are installed on the outside of the isothermal oven.

After weighing the entire weight of the absorption reactor R1 into which a certain amount of absorbent was put along with a magnet bar, the absorption reactor was stirred at 60° C. for one hour to be dried under vacuum, and then the temperature was reduced to 40° C. so that the absorption reactor and the isothermal oven were maintained at a constant temperature. After closing a valve V4 connected to the absorption reactor R1, carbon dioxide at a constant pressure (e.g., 10 to 50 atm) was put into the storage cylinder S2, and the pressure and temperature in equilibrium were recorded. Then, after the stirring of the absorption reactor R1 was stopped and the pressure of the absorption reactor R1 was maintained at a constant pressure by using the valve V4 and a pressure regulator, the pressure and temperature of the storage cylinder S2 in equilibrium were recorded, and then the stirring was started. After one hour, the final pressure and temperature (equilibrium values) were recorded, and a change in the weight of the absorption reactor R1 was measured.

Further, during a separation test, after closing the valve V4 and increasing the temperature of the absorption reactor R1 to 70° C. to 140° C., the valve V4, a valve V5 and a valve V6 were opened, and 20 ml/min of nitrogen was introduced to the absorption reactor R1 from the $N_2$ storage cylinder S3 to separate carbon dioxide. Then, the temperature was reduced to room temperature, and a change in the weight before and after the separation was measured.

Examples 1 to 9

30 g of an aqueous solution absorbent having a weight ratio of triamine/diamine/dialkylene glycol dialkyl ether or trialkylene glycol dialkyl ether/water of 30/5/15/50 shown in Table 1 below was added to the absorption reactor R1 illustrated in FIG. 1, and then carbon dioxide absorption tests were performed while maintaining the temperature of the isothermal oven at 40° C. After stirring of the absorption reactor R1 was stopped, the pressure of the absorption reactor R1 was maintained at 1 atm by using the valve V4 and a pressure regulator, and the pressure of the storage cylinder S2 maintained in equilibrium was recorded, and then the stirring was started again. After one hour, the final pressure was recorded, and the amount of carbon dioxide absorbed per mole of amine was calculated from the difference.

In the case of the separation and carbon dioxide reabsorption tests, after closing the valve (V4) and raising the temperature of the absorption reactor (R1) to 100° C., the valve (V4), the valve (V5) and the valve (V6) were opened, and carbon dioxide was separated for 1 hour while introducing 20 ml/min of nitrogen to the absorption reactor (R1), and then the tests of reabsorbing carbon dioxide at 40° C. were carried out. Further, in order to ensure the accuracy of the measurement, the weight change of the absorption reactor (R1) was measured before and after absorption and separation tests, and the results are shown in Table 1 below as the cyclic capacity (mole number of carbon dioxide absorbed per mole of amine at the time of reabsorbing carbon dioxide after separation).

TABLE 1

| Example | triamine | diamine | Dialkylene glycol dialkyl ether or trialkylene glycol dialkyl ether | $CO_2$ absorption capacity (mole of $CO_2$/mole of amine) | Cyclic capacity (mole of $CO_2$/mole of amine) |
|---|---|---|---|---|---|
| 1 | 3,3'-iminobis(N,N-dimethylpropylamine) | Piperazine | diethylene glycol diethyl ether | 1.69 | 1.59 |
| 2 | 2,2'-iminobis(N,N-dimethylethylamine) | 1,4-diamino butane | diethylene glycol dimethyl ether | 1.67 | 1.54 |
| 3 | 2,2'-iminobis(N,N-diethylethylamine) | 1,6-diamino hexane | dipropylene glycol dimethyl ether | 1.54 | 1.38 |
| 4 | 3,3'-iminobis(N,N-dimethylpropylamine) | 1,8-diamino octane | triethylene glycol dimethyl ether | 1.68 | 1.48 |
| 5 | N,N-bis[3-(methyl-amino)propyl]methylamine | N,N-dimethyl-1,6-diamino hexane | diethylene glycol dibutyl ether | 1.57 | 1.53 |
| 6 | N,N'-(iminobispropylene)bis-methaneamine | 1-methylpiperazine | tripropylene glycol dipropyl ether | 1.62 | 1.55 |
| 7 | 3,3'-iminobis(N,N-dimethylpropylamine) | 2-methylpiperazine | diethylene glycol ethyl metyl ether | 1.55 | 1.47 |
| 8 | 3,3'-iminobis(N,N-dimethylpropylamine) | N-(2-aminoethyl)piperazine | diethylene glycol dipropyl ether | 1.65 | 1.57 |
| 9 | 3,3'-iminobis(N,N-dimethylpropylamine) | 1,2-dimethylpiperazine | tripropylene glycol diethyl ether | 1.55 | 1.50 |

Examples 10 to 13

Carbon dioxide absorption tests were carried out in the same manner as in Example 1: by using an absorbent having the same composition as in Example 1; and by varying the absorption temperature while fixing the carbon dioxide pressure at 1 atm. The results are shown in Table 2 below.

TABLE 2

| Example | Absorption temperature (° C.) | $CO_2$ absorption capacity (mole of $CO_2$/mole of amine) | Cyclic capacity (mole of $CO_2$/mole of amine) |
|---|---|---|---|
| 10 | 10 | 1.83 | 1.67 |
| 11 | 30 | 1.72 | 1.61 |
| 12 | 50 | 1.44 | 1.33 |
| 13 | 60 | 1.12 | 1.04 |

Examples 14 to 17

Carbon dioxide absorption tests were carried out in the same manner as in Example 1: by using an absorbent having the same composition as in Example 1; and by varying the absorption pressure while fixing the temperature at 40° C. The results are shown in Table 3 below.

TABLE 3

| Example | Absorption pressure (atm) | $CO_2$ Absorption capacity (mole of $CO_2$/mole of amine) | Cyclic capacity (mole of $CO_2$/mole of amine) |
|---|---|---|---|
| 14 | 2 | 1.75 | 1.66 |
| 15 | 5 | 1.84 | 1.70 |
| 16 | 10 | 1.91 | 1.82 |
| 17 | 30 | 1.98 | 1.85 |

Examples 18 to 21

Carbon dioxide absorption tests were carried out in the same manner as in Example 1: by changing the amount of water while fixing weight % of triamine/diamine/diethylene glycol diethyl ether at 60/10/30, the temperature at 40° C. and the pressure at 1 atm. The results are shown in Table 4 below. As the amount of water was decreased, the amount of carbon dioxide absorbed per mole of amine was reduced. The reason for this is considered that an increased amount of amine leads to an increase in the viscosity of an absorbent solution, thereby limiting delivery of materials.

TABLE 4

| Example | Content of water (wt %) | $CO_2$ absorption capacity (mole of $CO_2$/mole of amine) | Cyclic capacity (mole of $CO_2$/mole of amine) |
|---|---|---|---|
| 18 | 10 | 1.34 | 1.13 |
| 19 | 30 | 1.54 | 1.38 |
| 20 | 60 | 1.75 | 1.66 |
| 21 | 70 | 1.81 | 1.73 |

Examples 22 to 30

Carbon dioxide absorption tests were carried out in the same manner as in Example 1: by varying the composition (weight %) of triamine (A) as a main absorbent, diamine (B) as a rate enhancer and diethylene glycol diethyl ether (C) as a fine disproportionation agent while fixing the amount of water in the absorbent at 50 weight %, the absorption temperature at 40° C. and the absorption pressure at 1 atm. The results are shown in Table 5 below.

TABLE 5

| Example | Absorbent Composition (wt %) | | | $CO_2$ absorption capacity (mole of $CO_2$/mole of amine) | Cyclic capacity (mole of $CO_2$/mole of amine) |
|---|---|---|---|---|---|
| | A | B | C | | |
| 22 | 40 | 5 | 5 | 1.77 | 1.65 |
| 23 | 30 | 10 | 10 | 1.57 | 1.38 |
| 24 | 30 | 3 | 17 | 1.68 | 1.61 |
| 25 | 30 | 15 | 5 | 1.35 | 1.18 |
| 26 | 25 | 1 | 24 | 1.84 | 1.79 |
| 27 | 25 | 5 | 20 | 1.63 | 1.55 |

TABLE 5-continued

| Example | Absorbent Composition (wt %) | | | $CO_2$ absorption capacity (mole of $CO_2$/mole of amine) | Cyclic capacity (mole of $CO_2$/mole of amine) |
|---|---|---|---|---|---|
| | A | B | C | | |
| 28 | 25 | 10 | 15 | 1.45 | 1.26 |
| 29 | 10 | 30 | 10 | 1.21 | 1.07 |
| 30 | 14 | 1 | 35 | 1.89 | 1.83 |

Examples 31 to 39

Changes in cyclic capacity according to changes in the separation temperature and pressure were measured while fixing the composition of the absorbent and the absorption temperature (40° C.) in Example 1. The results are shown in Table 6 below.

TABLE 6

| Example | Separation temperature (° C.) | Separation pressure (atm) | $CO_2$ absorption capacity (mole of $CO_2$/mole of amine) | Cyclic capacity (mole of $CO_2$/mole of amine) |
|---|---|---|---|---|
| 31 | 70 | 1 | 1.69 | 0.98 |
| 32 | 80 | 1 | 1.69 | 1.15 |
| 33 | 90 | 1 | 1.69 | 1.32 |
| 34 | 100 | 2 | 1.69 | 1.61 |
| 35 | 110 | 1 | 1.69 | 1.67 |
| 36 | 110 | 2 | 1.69 | 1.68 |
| 37 | 120 | 1 | 1.69 | 1.69 |
| 38 | 130 | 1 | 1.69 | 1.69 |
| 39 | 140 | 1 | 1.69 | 1.69 |

Comparative Example 1

The separation test was performed in the same manner as in Example 1 by absorbing carbon dioxide at 1 atm and 40° C. by using an aqueous solution containing 50% by weight of monoethanolamine as an absorbent, and separating the absorbed carbon dioxide at normal pressure and 100° C. As a result, the carbon dioxide absorption capacity was 0.55 mol of carbon dioxide per mole of monoethanolamine; however, when carbon dioxide was reabsorbed after separation at 100° C., the cyclic capacity was confirmed that carbon dioxide was absorbed only by 0.19 mol per 1 mol of monoethanolamine and the absorption capacity of the monoethanolamine aqueous solution was reduced by about 65.5%.

DESCRIPTION OF REFERENCE NUMERALS

R1: absorption reactor
S1: $CO_2$ supply container
S2: $CO_2$ storage cylinder
S3: $N_2$ storage cylinder
P1: Pressure transducer for high pressure
PR1, PR2: Pressure regulator
T1, T2: Thermometer
V1 to V6: Valve
1: Stirrer

The invention claimed is:

1. A carbon dioxide absorbent comprising: a triamine represented by the following chemical formula 1, a linear diamine represented by the following chemical formula 2 or a cyclodiamine represented by the following chemical formula 3 and a dialkylene glycol dialkyl ether or trialkylene glycol dialkyl ether represented by the following chemical formula 4:

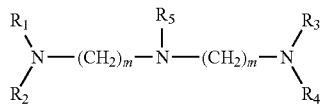

[Chemical Formula 1]

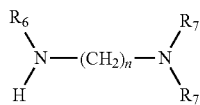

[Chemical Formula 2]

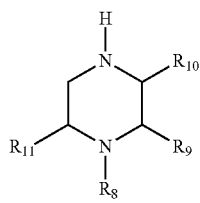

[Chemical Formula 3]

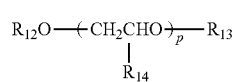

Chemical Formula 4 wherein,
$R_1$, $R_2$, $R_3$ and $R_4$ are each independently hydrogen or a $C_1$-$C_4$ alkyl group,
$R_5$ is hydrogen or a $C_1$-$C_4$ alkyl group,
$R_6$ and $R_7$ are each independently hydrogen or a $C_1$-$C_4$ alkyl group,
$R_8$ is hydrogen, a $C_1$-$C_4$ alkyl group or a $C_1$-$C_4$ aminoalkyl group,
$R_9$, $R_{10}$ and $R_{11}$ are each independently hydrogen or a $C_1$-$C_4$ alkyl group,
$R_{12}$ and $R_{13}$ are each independently a $C_1$-$C_4$ alkyl group,
$R_{14}$ is hydrogen or methyl,
m is an integer of 2 or 3,
n is an integer of 4 to 8, and
p is an integer of 2 or 3.

2. The carbon dioxide absorbent according to claim 1, wherein
$R_1$, $R_2$, $R_3$ and $R_4$ are each independently hydrogen, methyl or ethyl,
$R_5$ is hydrogen or methyl,
$R_6$ and $R_7$ are each independently hydrogen, methyl or ethyl,
$R_8$ is hydrogen, methyl, ethyl, propyl, butyl or aminoethyl,
$R_9$, $R_{10}$ and $R_{11}$ are each independently hydrogen or methyl,
$R_{12}$ and $R_{13}$ are each independently methyl, ethyl, propyl or butyl, and
$R_{14}$ is hydrogen or methyl.

3. The carbon dioxide absorbent according to claim 1, wherein the triamine represented by the chemical formula 1 is selected from the group consisting of 2,2'-iminobis(N,N-dimethylethylamine), 2,2'-iminobis(N,N-diethylethylamine), 3,3'-iminobis(N,N-dimethylpropylamine), 3,3'-iminobis(N,N-diethylpropylamine), 2,2'-iminobis(N,N'-dimethylethylamine), N,N-bis[2-(methylamino)ethyl]methylamine, N,N-bis[3-(methylamino)propyl]methylamine, N,N'-(iminobisethylene)bismethaneamine, and N,N'-(iminobispropylene)bismethaneamine.

4. The carbon dioxide absorbent according to claim 1, wherein the linear diamine represented by the chemical formula 2 is selected from the group consisting of 1,4-diaminobutane, 1,5-diaminopentane, 1,6-diaminohexane, 1,7-diaminoheptane, 1,8-diaminooctane, N,N-dimethyl-1,4-diaminobutane, N,N-diethyl-1,4-diaminobutane, N,N-dimethyl-1,5-diaminopentane, N,N-diethyl-1,5-diaminopentane, N,N-dimethyl-1,6-diaminohexane, N,N-diethyl-1,6-diaminohexane, N,N-dimethyl-1,7-diaminoheptane, N,N-diethyl-1,7-diaminoheptane, N,N-dimethyl-1,8-diaminooctane, and N,N-diethyl-1,8-diaminooctane.

5. The carbon dioxide absorbent according to claim 1, wherein the cyclodiamine represented by the chemical formula 3 is selected from the group consisting of piperazine, 1-methylpiperazine, 1-ethylpiperazine, 1-propylpiperazine, 1-isopropylpiperazine, 1-butylpiperazine, 2-methylpiperazine, 1,2-dimethylpiperazine, 1,5-dimethylpiperazine, 1,6-dimethylpiperazine, and N-(2-aminoethyl)piperazine.

6. The carbon dioxide absorbent according to claim 1, wherein the dialkylene glycol dialkyl ether or trialkylene glycol dialkyl ether represented by the chemical formula 4 is selected from the group consisting of diethylene glycol dimethyl ether, diethylene glycol diethyl ether, diethylene glycol ethyl methyl ether, diethylene glycol dipropyl ether, diethylene glycol dibutyl ether, dipropylene glycol dimethyl ether, dipropylene glycol diethyl ether, dipropylene glycol ethyl methyl ether, dipropylene glycol dipropyl ether, dipropylene glycol dibutyl ether, triethylene glycol dimethyl ether, triethylene glycol diethyl ether, triethylene glycol dipropyl ether, triethylene glycol dibutyl ether, tripropylene glycol dimethyl ether, tripropylene glycol diethyl ether, tripropylene glycol dipropyl ether, and tripropylene glycol dibutyl ether.

7. The carbon dioxide absorbent according to claim 1, wherein the amount of the triamine is 10 to 70% by weight based on the total amount of the absorbent.

8. The carbon dioxide absorbent according to claim 1, wherein the amount of the linear diamine or cyclodiamine is 1 to 30% by weight based on the total amount of the absorbent.

9. The carbon dioxide absorbent according to claim 1, wherein the amount of the dialkylene glycol dialkyl ether or trialkylene glycol dialkyl ether is 5 to 40% by weight based on the total amount of the absorbent.

10. The carbon dioxide absorbent according to claim 1, wherein the carbon dioxide absorbent is dissolved in water.

11. The carbon dioxide absorbent according to claim 10, wherein the amount of water is 10 to 70% by weight based on the total amount of the absorbent.

12. A separation method of carbon dioxide from a gas mixture, which comprises the steps of:
   (i) absorbing carbon dioxide by using the carbon dioxide absorbent according to claim 1; and
   (ii) separating the absorbed carbon dioxide from the carbon dioxide absorbent.

13. The separation method according to claim 12, wherein the absorption temperature in step (i) is in the range of 10° C. to 60° C.

14. The separation method according to claim 12, wherein the absorption pressure in step (i) is in the range of normal pressure to 30 atm.

15. The separation method according to claim 12, wherein the separation temperature in step (ii) is in the range of 70° C. to 140° C.

16. The separation method according to claim 12, wherein the separation pressure in step (ii) is in the range of normal pressure to 2 atm.

\* \* \* \* \*